United States Patent
Kerselaers et al.

(10) Patent No.: US 10,320,086 B2
(45) Date of Patent: Jun. 11, 2019

(54) NEAR-FIELD ELECTROMAGNETIC INDUCTION (NFEMI) ANTENNA

(71) Applicant: NXP B.V., Eindhoven (NL)

(72) Inventors: Anthony Kerselaers, Herselt (BE); Liesbeth Gommé, Leuven (BE)

(73) Assignee: NXP B.V., Eindhoven (NL)

( * ) Notice: Subject to any disclaimer, the term of this patent is extended or adjusted under 35 U.S.C. 154(b) by 313 days.

(21) Appl. No.: 15/146,665

(22) Filed: May 4, 2016

(65) Prior Publication Data

US 2017/0324170 A1    Nov. 9, 2017

(51) Int. Cl.
| | | |
|---|---|---|
| H01Q 1/22 | (2006.01) | |
| H01Q 1/24 | (2006.01) | |
| H01Q 7/00 | (2006.01) | |
| H01Q 7/08 | (2006.01) | |
| H04B 5/00 | (2006.01) | |
| H01Q 21/00 | (2006.01) | |
| H01Q 1/27 | (2006.01) | |
| H01Q 1/52 | (2006.01) | |
| H01Q 9/28 | (2006.01) | |

(52) U.S. Cl.
CPC ....... *H01Q 21/0006* (2013.01); *H01Q 1/2208* (2013.01); *H01Q 1/243* (2013.01); *H01Q 1/273* (2013.01); *H01Q 1/526* (2013.01); *H01Q 7/00* (2013.01); *H01Q 7/08* (2013.01); *H01Q 9/285* (2013.01); *H04B 5/0012* (2013.01); *H04B 5/0031* (2013.01); *H04B 5/0081* (2013.01)

(58) Field of Classification Search
CPC .......... H01Q 21/006; H01Q 7/00; H01Q 7/08; H01Q 1/2208
See application file for complete search history.

(56) References Cited

U.S. PATENT DOCUMENTS

| | | | |
|---|---|---|---|
| 3,766,476 | A | 10/1973 | Silitch |
| 4,334,315 | A | 6/1982 | Ono |
| 4,692,743 | A | 9/1987 | Holden |
| 5,673,054 | A | 9/1997 | Hama |

(Continued)

FOREIGN PATENT DOCUMENTS

| | | |
|---|---|---|
| CN | 102013895 A | 4/2011 |
| CN | 102449923 A | 5/2012 |

(Continued)

OTHER PUBLICATIONS

Non-Final Office Action dated Jan. 3, 2017 for U.S. Appl. No. 14/576,030, 39 pages.

(Continued)

*Primary Examiner* — Jessica Han
*Assistant Examiner* — Amal Patel

(57) ABSTRACT

One example discloses a near-field electromagnetic induction (NFEMI) antenna, including: an electric antenna including a first electrically conductive surface; a magnetic antenna including a first coil (L1) coupled to a second coil (L2); a first feeding connection coupled to one end of the first coil; a second feeding connection coupled to another end of the first coil and one end of the second coil; wherein a another end of the second coil is connected to the electrically conductive surface; and a magnetic permeable material coupled to one side of the magnetic antenna and configured to be placed between the magnetic antenna and a set of electric components.

18 Claims, 11 Drawing Sheets

(56) References Cited

U.S. PATENT DOCUMENTS

| | | |
|---|---|---|
| 5,708,732 A | 1/1998 | Merhav et al. |
| 5,907,522 A | 5/1999 | Teodoridis |
| 5,914,701 A | 6/1999 | Gersheneld |
| 5,926,573 A | 7/1999 | Kim et al. |
| 5,948,006 A | 9/1999 | Mann |
| 6,104,913 A | 8/2000 | McAllister |
| 6,211,799 B1 | 4/2001 | Post et al. |
| 6,223,018 B1 | 4/2001 | Fukumoto et al. |
| 6,275,737 B1 | 8/2001 | Mann |
| 6,424,820 B1 | 7/2002 | Burdick et al. |
| 6,754,472 B1 | 6/2004 | Williams |
| 6,816,600 B1 | 11/2004 | Jakob |
| 7,142,681 B2 | 11/2006 | Kortekaas |
| 7,171,177 B2 | 1/2007 | Park et al. |
| 7,206,423 B1 | 4/2007 | Feng et al. |
| 7,254,246 B2 | 8/2007 | Jakob |
| 7,509,092 B2 | 3/2009 | Ishibashi et al. |
| 7,664,476 B2 | 2/2010 | Yanagida |
| 7,684,769 B2 | 3/2010 | Song et al. |
| 7,783,067 B1 | 8/2010 | Frerking |
| 7,796,943 B2 | 9/2010 | Levan |
| 7,907,057 B2 | 3/2011 | Schaffler et al. |
| 8,005,547 B2 | 8/2011 | Forsberg |
| 8,237,622 B2 | 8/2012 | Furumura et al. |
| 8,265,554 B2 | 9/2012 | Hwang |
| 8,280,302 B2 | 10/2012 | Kubono |
| 8,401,470 B2 | 3/2013 | Kroenstoel |
| 8,452,234 B2 | 5/2013 | Hasegawa et al. |
| 8,509,689 B2 | 8/2013 | Nakamura et al. |
| 8,526,879 B2 | 9/2013 | Kristiansen |
| 8,532,568 B2 * | 9/2013 | Kerselaers ........... H04B 5/0087 343/726 |
| 8,606,177 B2 | 12/2013 | Hwang |
| 8,644,542 B2 | 2/2014 | Klemenz |
| 8,797,148 B2 | 8/2014 | Kato et al. |
| 8,829,725 B2 | 9/2014 | Urano |
| 8,829,726 B2 | 9/2014 | Urano |
| 8,878,735 B2 | 11/2014 | Kvist et al. |
| 8,892,055 B2 | 11/2014 | Gasperi et al. |
| 8,909,966 B2 | 12/2014 | Furukawa |
| 9,019,131 B2 | 4/2015 | Kim |
| 9,024,725 B2 | 5/2015 | Ikemoto |
| 9,083,391 B2 | 7/2015 | Teggatz |
| 9,130,273 B2 | 9/2015 | Kataoka |
| 9,197,986 B1 | 11/2015 | Kerselaers et al. |
| 9,314,381 B2 | 4/2016 | Curran et al. |
| 9,455,771 B2 | 9/2016 | Dobyns |
| 9,647,462 B2 | 5/2017 | Angst et al. |
| 9,729,979 B2 | 8/2017 | Ozden |
| 9,819,097 B2 | 11/2017 | Kerselaers et al. |
| 2002/0003503 A1 | 1/2002 | Justice |
| 2002/0181579 A1 | 12/2002 | Vetro et al. |
| 2004/0023216 A1 | 2/2004 | Lu et al. |
| 2004/0027296 A1 | 2/2004 | Gerber |
| 2004/0138723 A1 | 7/2004 | Malick et al. |
| 2005/0058201 A1 | 3/2005 | Fernandes |
| 2006/0008038 A1 | 1/2006 | Song et al. |
| 2006/0114993 A1 | 6/2006 | Xiong et al. |
| 2006/0134918 A1 | 6/2006 | Fujii et al. |
| 2006/0215919 A1 | 9/2006 | Srinivasan |
| 2006/0233258 A1 | 10/2006 | Holcomb |
| 2006/0252371 A1 | 11/2006 | Toshiharu |
| 2007/0058713 A1 | 3/2007 | Shen et al. |
| 2007/0116308 A1 | 5/2007 | Zurek et al. |
| 2007/0190940 A1 | 8/2007 | Lee et al. |
| 2007/0291970 A1 | 12/2007 | Nikles |
| 2008/0182517 A1 | 7/2008 | Rass |
| 2008/0186241 A1 | 8/2008 | Christensen |
| 2008/0261523 A1 | 10/2008 | Kubono et al. |
| 2008/0262376 A1 | 10/2008 | Price |
| 2008/0267436 A1 | 10/2008 | Kerselaers et al. |
| 2009/0041241 A1 | 2/2009 | Dobyns et al. |
| 2009/0067653 A1 | 3/2009 | Meskens et al. |
| 2009/0202084 A1 | 8/2009 | Joeng et al. |
| 2009/0238279 A1 | 9/2009 | Tu et al. |
| 2009/0315787 A1 | 12/2009 | Schatzle |
| 2009/0322540 A1 | 12/2009 | Richardson et al. |
| 2010/0036773 A1 | 2/2010 | Bennet |
| 2010/0136905 A1 | 6/2010 | Kristiansen |
| 2010/0311326 A1 | 12/2010 | Klabunde et al. |
| 2011/0029041 A1 | 2/2011 | Wiskerke |
| 2011/0046730 A1 | 2/2011 | Meskens |
| 2011/0137649 A1 | 6/2011 | Rasmussen et al. |
| 2011/0196452 A1 | 8/2011 | Forsell |
| 2011/0248673 A1 | 10/2011 | Aerts et al. |
| 2011/0250837 A1 | 10/2011 | Hwang |
| 2011/0255702 A1 | 10/2011 | Jensen |
| 2011/0300801 A1 | 12/2011 | Kerselaers |
| 2012/0032778 A1 | 2/2012 | Nakano et al. |
| 2012/0306714 A1 * | 12/2012 | Yosui .................. H01Q 1/2208 343/788 |
| 2013/0002517 A1 | 1/2013 | Pascolini et al. |
| 2013/0113662 A1 * | 5/2013 | Kato ........................ H01Q 1/38 343/702 |
| 2013/0148828 A1 | 6/2013 | Fort |
| 2013/0171933 A1 | 7/2013 | Rofougaran |
| 2013/0278470 A1 | 10/2013 | Kataoka |
| 2013/0308805 A1 | 11/2013 | Ozden |
| 2013/0339025 A1 | 12/2013 | Suhami |
| 2014/0008446 A1 | 1/2014 | Carr |
| 2014/0023216 A1 | 1/2014 | Solum et al. |
| 2014/0049440 A1 | 2/2014 | Ueki et al. |
| 2014/0062212 A1 | 3/2014 | Sun et al. |
| 2014/0184462 A1 | 7/2014 | Kuniaki |
| 2014/0213184 A1 | 7/2014 | Matsubara |
| 2014/0241555 A1 | 8/2014 | Terlizzi |
| 2014/0315486 A1 | 10/2014 | Broyde et al. |
| 2014/0320369 A1 | 10/2014 | Azenui et al. |
| 2014/0340032 A1 | 11/2014 | Curtis |
| 2015/0001956 A1 | 1/2015 | Saen |
| 2015/0028690 A1 | 1/2015 | Sako |
| 2015/0038075 A1 | 2/2015 | Kataoka |
| 2015/0038864 A1 | 2/2015 | Kataoka et al. |
| 2015/0048985 A1 | 2/2015 | Park et al. |
| 2015/0061587 A1 | 3/2015 | Bruechmann |
| 2015/0079902 A1 | 3/2015 | Dhayni |
| 2015/0092962 A1 | 4/2015 | Amento |
| 2015/0097442 A1 | 4/2015 | Muurinen |
| 2015/0125883 A1 | 5/2015 | Gordon et al. |
| 2015/0130465 A1 | 5/2015 | Wiggins et al. |
| 2015/0318603 A1 | 11/2015 | Kerselaers et al. |
| 2015/0318613 A1 | 11/2015 | Kerselaers et al. |
| 2015/0318896 A1 | 11/2015 | Kerselaers et al. |
| 2015/0318932 A1 | 11/2015 | Kerselaers et al. |
| 2015/0319545 A1 | 11/2015 | Kerselaers et al. |
| 2015/0351292 A1 | 12/2015 | Chang et al. |
| 2016/0149313 A1 | 5/2016 | Gomme et al. |
| 2016/0189860 A1 | 6/2016 | Konanur et al. |
| 2016/0261026 A1 | 9/2016 | Han et al. |
| 2017/0125883 A1 * | 5/2017 | Tenno .................. H01Q 1/2283 |

FOREIGN PATENT DOCUMENTS

| | | |
|---|---|---|
| CN | 103024621 A | 4/2013 |
| CN | 103283262 A | 9/2013 |
| CN | 103515694 A | 1/2014 |
| CN | 102570000 B | 8/2015 |
| JP | WO-2016/002423 A1 | 1/2016 |
| JP | WO 2016002423 A1 * | 1/2016 ............ G06K 19/07 |
| KR | 101 584 555 B1 | 1/2016 |
| KR | 101584555 B1 | 1/2016 |
| WO | 03/030991 A1 | 4/2003 |
| WO | WO03030991 A1 | 4/2003 |
| WO | WO2013183575 | 12/2013 |
| WO | 2016/002423 A1 | 1/2016 |

OTHER PUBLICATIONS

Non-Final Office Action dated Jan. 19, 2017 for U.S. Appl. No. 14/575,865, 45 pages.

Final Office Action dated Jan. 19, 2017 for U.S. Appl. No. 14/551,988, 21 pages.

(56) References Cited

OTHER PUBLICATIONS

U.S. Appl. No. 14/551,988 not yet published; 36 pages (filed Nov. 24, 2014).
U.S. Appl. No. 14/836681, not yet published; 28 pages (filed Aug. 26, 2015).
Cho, Namjun et al; "A Planar MICS Band Antenna combined With a Body channel Communication Electrode for Body Sensor Network"; IEEE Transactions on Microwave Theory and Techniquest, vol. 57, No. 10; pp. 2515-2522 (Oct. 2009).
International Search Report dated Jul. 17, 2015 for International Application No. PCT/EP2015/058052.
International Search Report dated Jul. 9, 2015 for International Application No. PCT/EP2015/058071.
International Search Report for Application PCT/EP2015/058044 dated Jul. 13, 2015.
Kado, Yuichi et al; "RedTacton Near-body Electric-Field Communications Technology and Its Applications"; NTT Technical Review—Special Feature: Trends and Business Prospects for Human-area Networking Technology—Connecting People, Objects and Networks, vol. 8, No. 3; 6 pages (Mar. 2010).
Shinagawa, Mitsuru et al; "A Near-Field-Sensing Transceiver for Intra-body Communication Based on the Electro-Optic Effect"; Instrumentation and Measurement Technology Conference, Vail, CO, US; 6 pages (May 20-22, 2003).
Zimmerman, T.G.; "Personal Area Networks: Near-field intrabody communication"; IBM Systems Journal, vol. 35, Nos. 3&4; 9 pages (1996).
Non-Final Office Action dated Dec. 7, 2017 for U.S. Appl. No. 14/270,013; 11 pages.
Non-Final Office Action dated Jan. 25, 2017 for U.S. Appl. No. 14/569,024, 51 pages.
Non Final Office Action, U.S. Appl. No. 14/270,013, 11 pages dated Feb. 29, 2016.
Non Final Office Action, U.S. Appl. No. 14/270,013, 27 pages dated May 7, 2015.
Final Office Action, U.S. Appl. No. 14/270,013, 107 pages dated Aug. 27, 2015.
Notice of Allowance, U.S. Appl. No. 14/551998, 25 pages dated Jun. 7, 2017.
Notice of Allowance, U.S. Appl. No. 14/576,030, 30 pages dated Jun. 27, 2017.
Final Office Action, U.S. Appl. No. 14/576,030, 29 pages dated Mar. 7, 2016.
Non Final Office Action, U.S. Appl. No. 14/576,030, 26 pages dated Oct. 5, 2015.
Notice of Allowance, U.S. Appl. No. 14/576,583, 34 pages dated Jun. 21, 2017.
Final Office Action, U.S. Appl. No. 14/576,583, 29 pages dated Feb. 25, 2016.
Non Final Office Action, U.S. Appl. No. 14/576,583, 26 pages dated Sep. 21, 2015.
Non Final Office Action, U.S. Appl. No. 14/569,024, 24 pages dated Oct. 5, 2015.
Final Office Action, U.S. Appl. No. 14/569,024, 29 pages dated Feb. 25, 2016.
Non Final Office Action, U.S. Appl. No. 14/575,865, 25 pages dated Oct. 5, 2015.
Final Office Action, U.S. Appl. No. 14/575,865, 18 pages dated Mar. 4, 2016.
Ex Parte Quayle, U.S. Appl. No. 14/836,681, 32 pages dated Feb. 27, 2017.
Notice of Allowance, U.S. Appl. No. 14/836,681, 14 pages dated Jun. 14, 2017.
Chandrasekar; "Inductively Coupled Connectors and Sockets for Multi-Gb/s Pulse Signaling"; IEEE Transactions on Advanced Packaging, vol. 31, No. 4; pp. 749-758 (Nov. 2008).
Ohishi; "Novel Pair Electrode With Coils Sensing Magnetic Energy on Human Body Surface for Intrabody Communication"; IEEE Int'l Symposium on Antennas and Propagation; pp. 203-206 (Oct. 29, 2012).
Tounsi; "Electromagnetic Modeling of an Integrated Micromachined Inductive Microphone"; IEEE Int'l Conference on Design and Technology of Integrated Systems in Nanoscale Era; pp. 38-43 (Apr. 6, 2009).
Zimmerman; "Personal Area Networks (PAN): Near-Field Intra-Body Communication"; Massachusetts Institute of Technology; 81 pages (Jun. 1995).
Corrected Notice of Allowance, U.S. Appl. No. 14/836,681, 2 pages dated Jun. 21, 2017.
Non Final Office Action, U.S. Appl. No. 14/576,583, 33 pages dated Nov. 3, 2016.
Notice of Allowance dated Apr. 25, 2018 for U.S. Appl. No. 14/270,013; 19 pages.
Notice of Allowance dated Mar. 22, 2018 for U.S. Appl. No. 14/575,865; 24 pages.
Non Final Office Action dated Aug. 26, 2016 for U.S. Appl. No. 14/270,013, 13 pages.
Non Final Office Action dated Jun. 29, 2016 for U.S. Appl. No. 14/551,988, 23 pages.
Office Action for CN application 201510224003.8; 11 pages (dated Mar. 23, 2017).
Office Action from application CN201510224911.7; 10 pages (dated Feb. 22, 2017).
Notice of Allowance dated Mar. 13, 2018 for U.S. Appl. No. 14/569,024; 15 pages.
Final Office Action dated Aug. 9, 2017 for U.S. Appl. No. 14/569,024, 52 pages.
Final Office Action dated Jul. 27, 2017 for U.S. Appl. No. 14/575,865, 56 pages.
Final Office Action dated Aug. 27, 2015 for U.S. Appl. No. 14/270,013, 17 pages.
Non-Final Office Action dated Feb. 29, 2016 for U.S. Appl. No. 14/270,013, 11 pages.
Non-Final Office Action dated May 7, 2015 for U.S. Appl. No. 14/270,013, 12 pages.
Notice of Allowance dated Jul. 21, 2015 for U.S. Appl. No. 14/302,791, 9 pages.
European Search Report dated Aug. 31, 2015 for EP 15164678, 6 pages.
Final Office Action dated Mar. 7, 2016 for U.S. Appl. No. 14/576,030, 13 pages.
Non-Final Office Action dated Oct. 5, 2015 for U.S. Appl. No. 14/576,030, 17 pages.
European Search Report dated Aug. 31, 2015 for EP 15164622, 6 pages.
Final Office Action dated Feb. 25, 2016 for U.S. Appl. No. 14/576,583, 13 pages.
Non-Final Office Action dated Sep. 21, 2015 for U.S. Appl. No. 14/576,583, 17 pages.
European Search Report dated Aug. 31, 2015 for EP 15164621, 8 pages.
Non-Final Office Action dated Oct. 5, 2015 for U.S. Appl. No. 14/569,024, 14 pages.
Final Office Action dated Feb. 25, 2016 for U.S. Appl. No. 14/569,324, 3 pages.
Non-Final Office Action dated Oct. 5, 2015 for U.S. Appl. No. 14/575,865, 17 pages.
Final Office Action dated Mar. 4, 2016 for U.S. Appl. No. 14/575,865, 14 pages.
European Search Report dated Aug. 31, 2015 for EP 15164610, 6 pages.
Chandrasekar, K., "Inductively Coupled Connectors and Sockets for Multi-Gb/s Pulse Signaling," IEEE Transactions on Advanced Packaging, vol. 31, No. 4; Nov. 1, 2008, pp. 749-758.
Ohishi, T. et al., "Novel Pair Electrode With Coils Sensing Magnetic Energy on Human Body Surface for Intrabody communication," IEEE International Symposium on Antennas and Propagation (ISAP); Oct. 29, 2012; pp. 203-206.
Tounsi, F. et al. "Electromagnetic Modeling of an Integrated Micromachined Inductive Microphone," IEEE 4th International Conference on Design and Technology of Integrated Systems in Nanoscale Era; Apr. 6, 2009; pp. 38-43.

(56) References Cited

OTHER PUBLICATIONS

Zimmerman, T.G., "Personal Area Networks (PAN): Near-Field Intra-Body Communication," Massachusetts Institute of Technology, Jun. 1995, 81 pages.
Final Office Action dated Mar. 14, 2017 for U.S. Appl. No. 14/270,013, 37 pages.
Corrected Notice of Allowance; U.S. Appl. No. 14/551,998; 5 pages (dated Aug. 25, 2017).

* cited by examiner

NEAR-FIELD ELECTROMAGNETIC INDUCTION (NFEMI) ANTENNA

INCORPORATION BY REFERENCE UNDER 37 CFR § 1.57

The specification herein incorporates by reference U.S. patent application Ser. No. 14/836,681 filed on 26 Aug. 2015 and U.S. patent application Ser. No. 14/270,013 filed on 5 May 2014.

The present specification relates to systems, methods, apparatuses, devices, articles of manufacture and instructions for a near-field electromagnetic induction (NFEMI) antenna.

Example embodiments of a near-field electromagnetic induction (NFEMI) communication system can operate near a human body by means of a combination of a magnetic field and electric field without the use of transversal radiating waves. Such NFEMI systems improve a wearable device's signal link budget and extending their range to a complete human body.

Whereas RF wireless communication may be accomplished by propagating an RF plane wave through free space, NFEMI communication utilizes non-propagating quasi-static fields. The quasi-static characteristic of the fields is the result of antenna dimensions in combination with the carrier frequency. The majority of the energy is stored in the form of magnetic and electric fields and a small amount of RF energy inevitably propagates in free space.

Small antenna geometries compared with the carrier wavelength are candidate for near field communication since they do not generate radiating waves in free space. Such an antenna can be a coil antenna that allows near field magnetic induction (NFMI). Other antennas communicate by means of both magnetic and electric near fields via near field electromagnetic induction (NFEMI). Such an antenna when in close proximity to the body will generate fields that are confined near the body.

SUMMARY

According to an example embodiment, a near-field electromagnetic induction (NFEMI) antenna, comprising: an electric antenna including a first electrically conductive surface; a magnetic antenna including a first coil (L1) coupled to a second coil (L2); a first feeding connection (637) coupled to one end of the first coil; a second feeding connection (635) coupled to another end of the first coil and one end of the second coil; wherein a another end of the second coil is connected to the electrically conductive surface; and a magnetic permeable material coupled to one side of the magnetic antenna and configured to be placed between the magnetic antenna and a set of electric components.

In another example embodiment, the magnetic permeable material is configured to shield the set of electronic components from a magnetic field generated by the coils.

In another example embodiment, the magnetic permeable material is at least one of: a planar sheet, a ferrite shield, a ferrite sheet or a coating comprising ferrite particles in suspension.

In another example embodiment, the magnetic permeable material is configured to spatially amplify magnetic flux generated by the coils toward a direction opposite from the set of electronic components.

In another example embodiment, a position of a conductive layer is at least one of: between the set of electronic components and the magnetic permeable material or between the magnetic permeable material and the coils.

In another example embodiment, the magnetic permeable material includes an adhesive on one side for adhering to the coils.

In another example embodiment, the first electrically conductive surface and the coils are in stacked configuration, wherein the first electrically conductive surface defines a first end of the stack and the coils define a second end of the stack.

In another example embodiment, a position of the magnetic permeable material is at least one of: between the coils and the first electrically conductive surface; or at either end of the stack.

In another example embodiment, further comprising a substrate configured to physically separate the coils from the electrically conductive surface in the stack.

In another example embodiment, the substrate is at least one of: a dielectric material, a ferrite material, air, plastic or a polymer.

In another example embodiment, the first electrically conductive surface includes an open end.

In another example embodiment, the first electrically conductive surface is a plate.

In another example embodiment, the electric antenna includes a second electrically conductive surface; and the first coil (L1) is configured to function as the second electrically conductive surface.

In another example embodiment, the first and second electrically conductive surfaces have substantially matching shapes.

In another example embodiment, the antenna is positioned on a backside of a mobile device or a wearable device.

According to an example embodiment, a wearable device, comprising: an electric antenna including a first electrically conductive surface; a magnetic antenna including a first coil coupled to a second coil; a first feeding connection coupled to one end of the first coil; a second feeding connection coupled to another end of the first coil and one end of the second coil; wherein a another end of the second coil is connected to the electrically conductive surface; and a magnetic permeable material coupled to one side of the magnetic antenna and configured to be placed between the magnetic antenna and a set of electric components; wherein the electric and magnetic antennas form a near-field electromagnetic induction (NFEMI) antenna.

In another example embodiment, the antenna is embedded in at least one of: a wearable device; a smart watch; a smartwatch housing, a wireless mobile device, an earbud, a hearing aid, a headphone, an activity tracker, or a heart rate monitor.

In another example embodiment, the antenna is embedded in a transceiver configured to communicate using near-field electromagnetic induction with another wearable device.

In another example embodiment, the antenna is configured to communicate signals using both magnetic and electric near-field induction.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings, in which:

Figure 1:
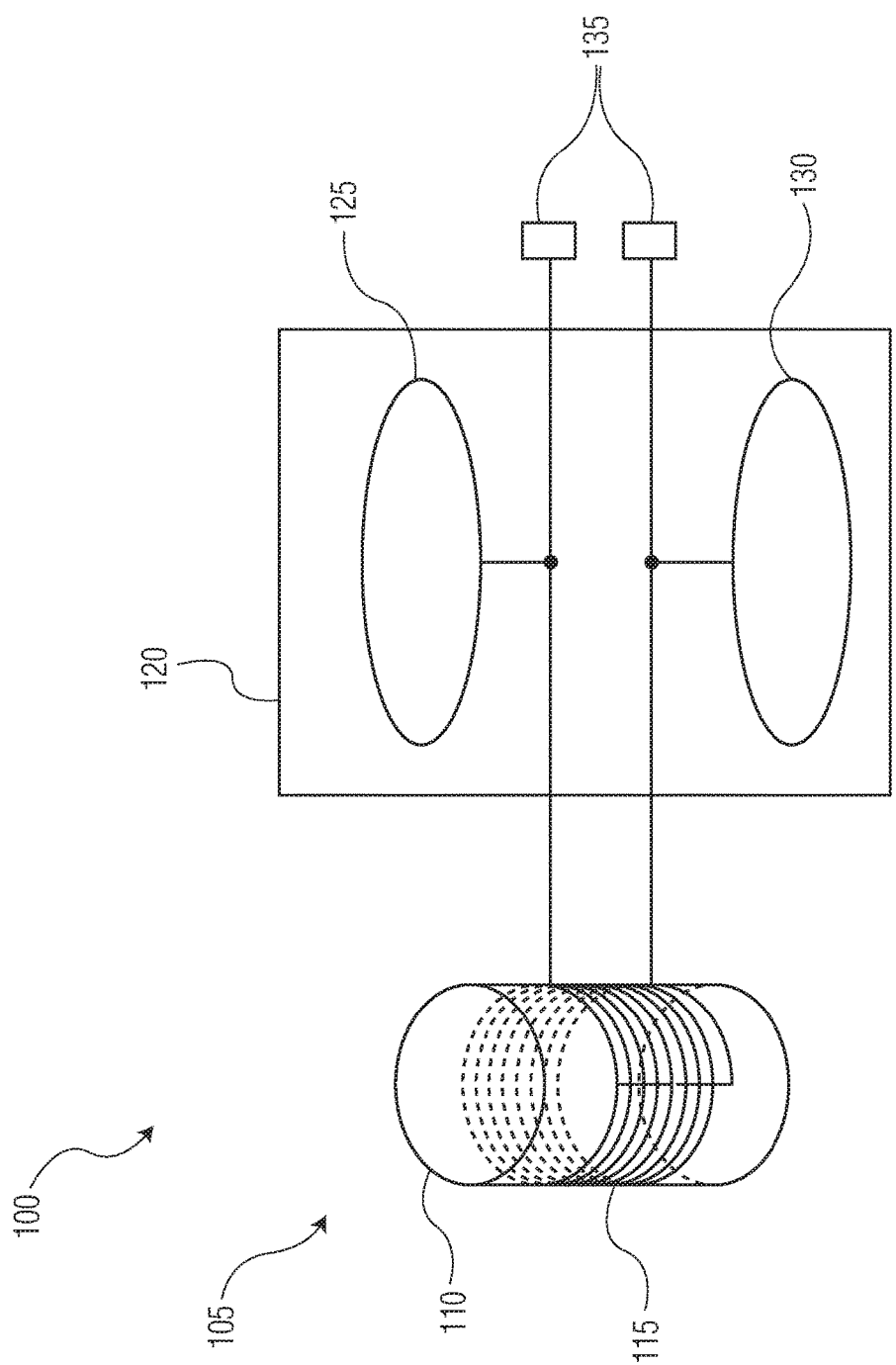
FIG. 1 is an idealized first example structure for a near-field electromagnetic induction (NFEMI) antenna.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

In one example, the NFEMI's magnetic field is generated by a current through a first coil and the electric field can be generated by a first coupling capacitor, having a first conducting plate coupled to the human body and a second conducting plate coupled to the environment. The magnetic and electric field may be received by a receiver at another place near the human body by means of a second coil and a second coupling capacitor, the second capacitor having a first conducting plate coupled to the human body and a second conducting plate coupled to the environment.

However implementation in small volume products, like earbuds, hearing aids, or smart watches, require very small antenna constructions that may reduce the robustness of the wireless communication link.

Therefore an antenna system is described below that provides an increased electric field strength in transmit mode and increases the received voltage in receive mode. As a result, this antenna system improves the reliability for wireless body communication in applications such as consumer lifestyle and healthcare area. This antenna system may be integrated into very small wireless portable products connected to the human body.

A near-field electromagnetic antenna system is described below which includes a combination of a short loaded dipole with one or two loading plates and a small loop antenna. The small loop antenna has at least two mutual coupled coils. Both coils are connected in series in such a way that they form a larger inductance compared with the inductance of one of the coils. Both coils may be on a ferrite material or they may be in the form of a planar structure. The first connection of the first coil may be connected to the first feeding connection and to the first loading plate of the small loaded dipole. The second connection of the first coil may be connected to the first connection of the second coil and to the second feeding connection. The second connection of the second coil may be connected to second loading plate of the small loaded dipole.

FIG. 1 is an idealized first example structure 100 for a near-field electromagnetic induction (NFEMI) antenna. The antenna 100 may include a coil antenna 105 (magnetic antenna) in conjunction with a short loaded dipole 120 (electric antenna). The coil antenna 105 may include a ferrite core 110 with a wire 115 wound around the core 110. The short dipole 120 may include two loading plates 125 and 130. In close proximity of the body, this antenna will provide fields that are confined near the body. The preferred transmit frequency is below 30 MHz to ensure that the fields are following the body contours and far field radiation is strongly reduced.

Figure 2:
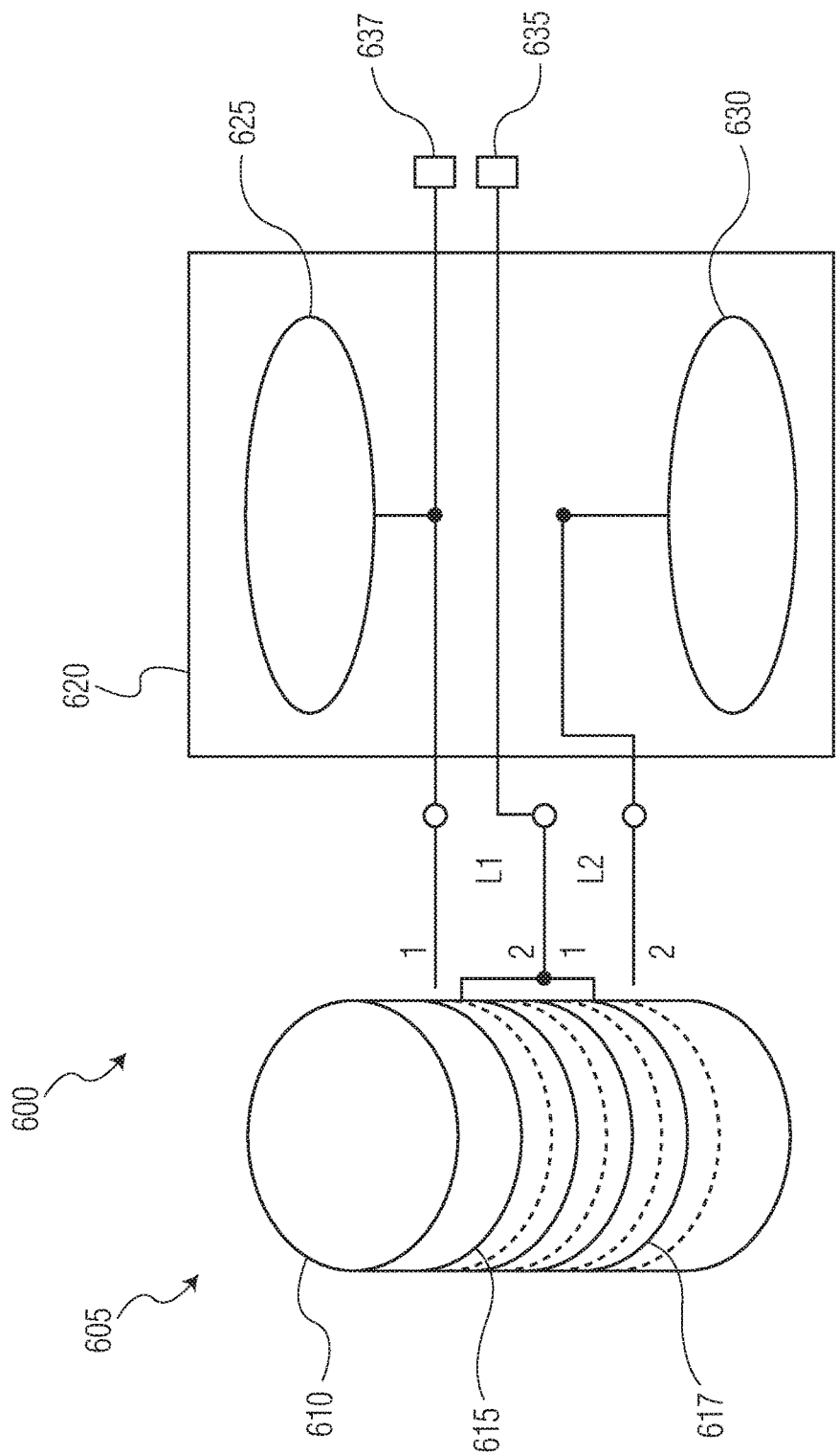
FIG. 2 is an idealized second example structure for a near-field electromagnetic induction (NFEMI) antenna.

FIG. 2 is an idealized second example structure 600 for a near-field electromagnetic induction (NFEMI) antenna 600. The antenna 600 is a combination of a short loaded dipole 620 with one or two plates 625 and 630 and a small loop antenna 605.

The small loop antenna includes at least two coupled coils 615 and 617. The first coil 615 has an inductance of L1, and the second coil 617 has an inductance of L2. Both coils 615 and 617 may be connected such that they form a larger inductance compared with the inductance of the first coil 615 and the second coil 617.

Both coils 615 and 617 may be air coils, wrapped around a ferrite core 610, or they can be in the form of a planar structure. In one example the coils 615 and 617 may be wrapped around the core 610 in an interleaved fashion. Alternatively the coils 615 and 617 may be wrapped on top of one another, i.e., the second coil 617 is first wrapped around the core 610, and then the first coil 615 is then wrapped around the core 610 on top of the second coil 617.

The first connection of the first coil 615 is connected to the first feeding connection 637 and to the first plate 625 of the short loaded dipole 620. The second connection of the first coil 615 is connected to the first connection of the second coil 617 and to the second feeding connection 635. The second connection of the second coil 617 is connected to second plate 630 of the short loaded dipole 620.

Figure 3:
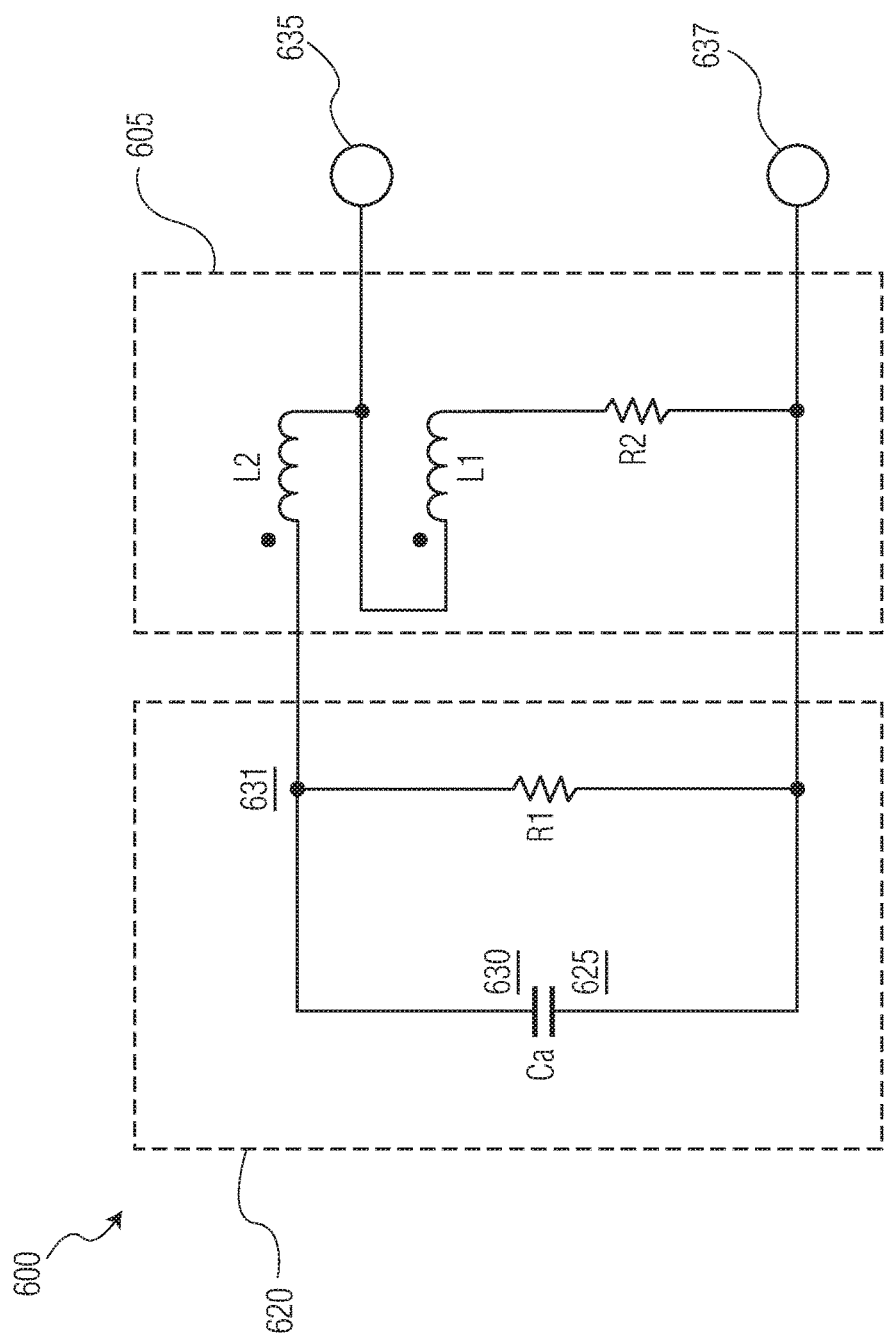
FIG. 3 is an example equivalent circuit for the second example structure.

FIG. 3 is an example equivalent circuit for the second example structure 600. The short loaded dipole 620 is electrically represented by capacitance Ca and resistance R1. The resistance R1 represents the loss of a medium (e.g. substrate 652 as discussed below) that separates the plates 625 and 630. In one example embodiment, the plates 625 and 630 are separate from the coils 615 and 617, while in another example embodiment at least one of the coils 615 and 617 also functions as at least one of the plates 625 and 630.

Figure 4A:
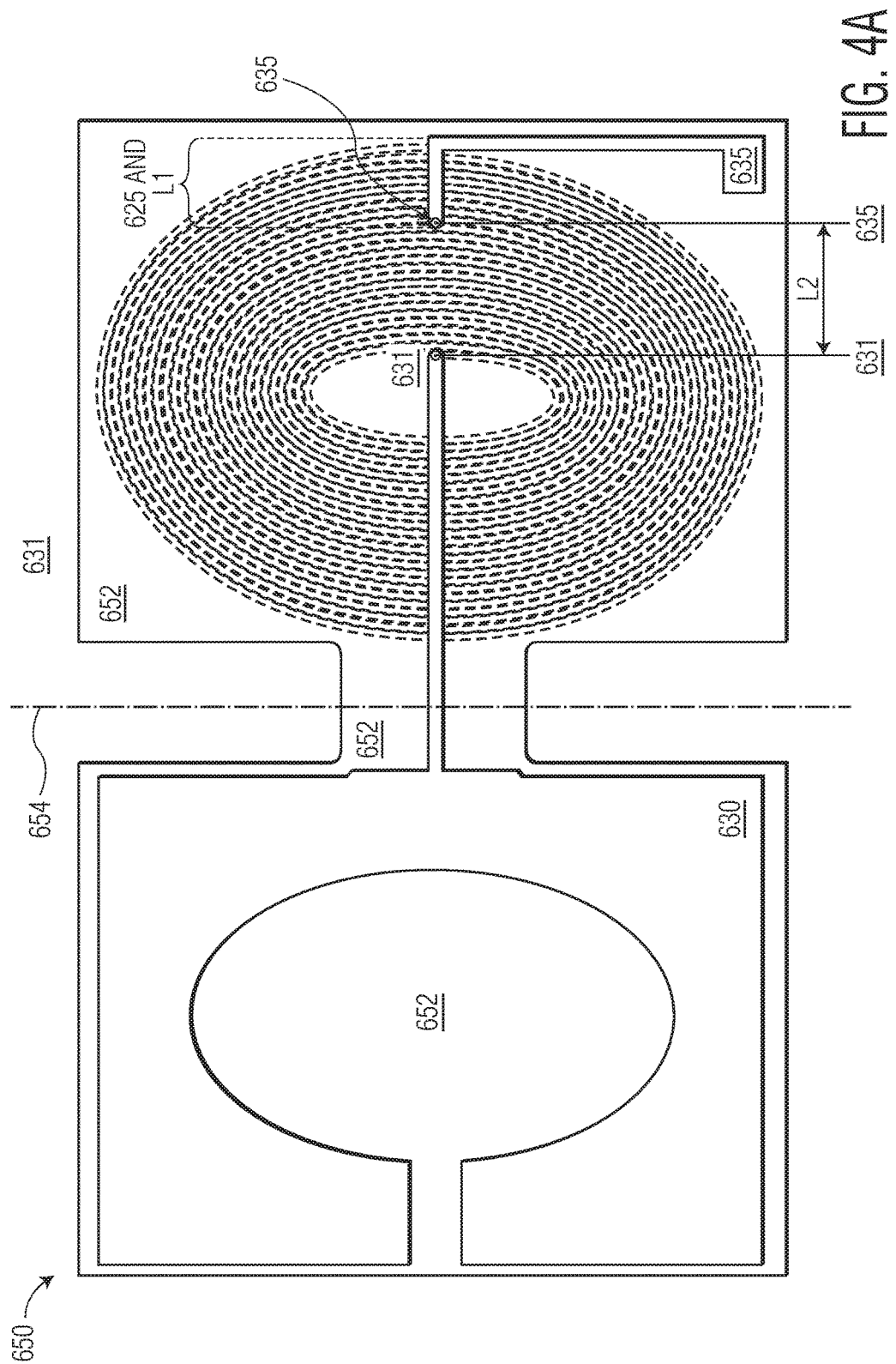
FIG. 4A is one planar side of a third example structure for a near-field electromagnetic induction (NFEMI) antenna.
Figure 4B:
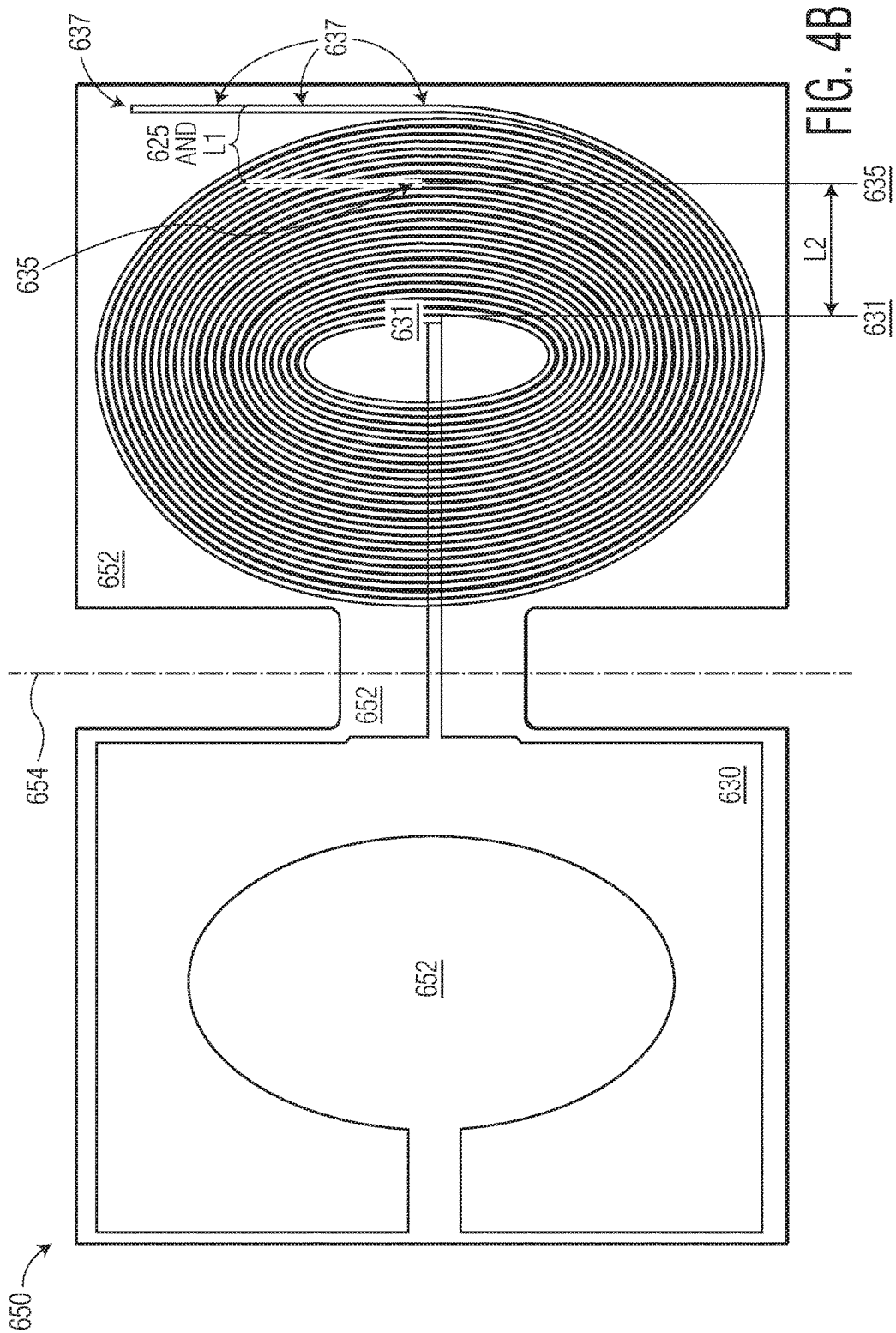
FIG. 4B is another planar side of the third example structure for a near-field electromagnetic induction (NFEMI) antenna.

FIG. 4A is one planar side and FIG. 4B is another planar side of a third example structure 650 for a near-field electromagnetic induction (NFEMI) antenna. The third example structure 650 is supported by a flexible substrate 652 (e.g. a polymer or polyimide with a high melting temperature, such as Kapton developed by DuPont) which can be folded along line 654 and inserted in, for example, a wearable device.

In one example embodiment, plate 625 (i.e. L1) is sized to match or overlap plate 630. Thus plate 630 instead of having a rectangular outside edge, can have inside and outside edges which substantially match or overlap just the L1 coil 625.

Figure 5:
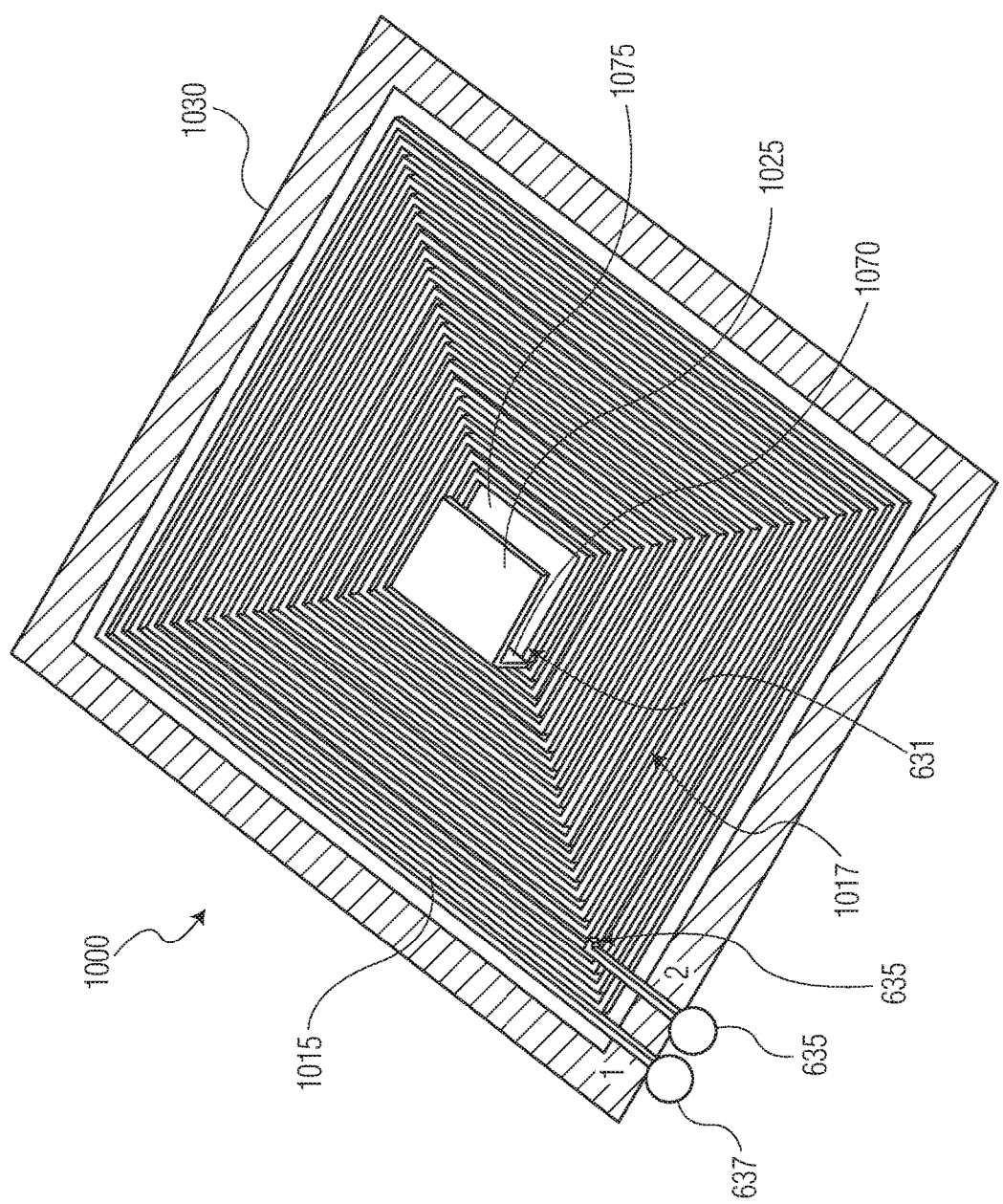
FIG. 5 is a fourth example structure for a near-field electromagnetic induction (NFEMI) antenna.

FIG. 5 is a fourth example structure 1000 for a near-field electromagnetic induction (NFEMI) antenna. The antenna 1000 includes a first coil 1015 and a second coil 1017 that are planar. The coils 1015 and 1017 are like the coils 615 and 617 described above.

The antenna 1000 is a combination of a short loaded monopole (electric antenna) 1070 with one plate 1025 and two planar coils 1015 and 1017 (magnetic antenna). Both planar coils 1015 and 1017 are electromagnetically coupled and connected in a series arrangement. Both coils 1015 and 1017 are connected in such a way that they form a larger inductance as compared with the inductance L1 of the first coil 1015 or the inductance L2 of the second coil 1017. Both coils 1015 and 1017 may be on a carrier of plastic or other material.

The first connection of the first coil 1015 is connected to the first feeding connection 637 (see FIG. 3). The second connection of the first coil 1015 is connected to the first connection of the second coil 1017 and to the second feeding connection 635. The second connection of the second coil 1017 is connected to the small loaded dipole 1070. As shown, the plate 1025 is spaced apart from the first coil 1015 and the second coil 1017 and is over an opening 1075 in the second coil 1017. The plate 1025 may be the same size as the opening 1075 or a smaller or larger size than the opening 1075.

In other embodiments, the plate 1025 may be situated over the first coil 1015. This location minimizes the effect that the plate 1025 has on the magnetic flux inside the first coil 1015. In order to minimize the size of the antenna 1000, the plate 1025 may be only over the first coil 1015, so as to constrain the size of the antenna 1000 to the size of the first coil 1015. Further, in such an arrangement the plate 1025 may be made larger than the size of the opening 1075, because it will not interfere with the magnetic flux of the first coil 1015.

The planar arrangement of the antenna 1000 has benefits when used in wearable devices, such as a smartwatch. The plate 1025 in one example is in contact with a user's skin, and in another example is not touching a user's skin.

Figure 6:
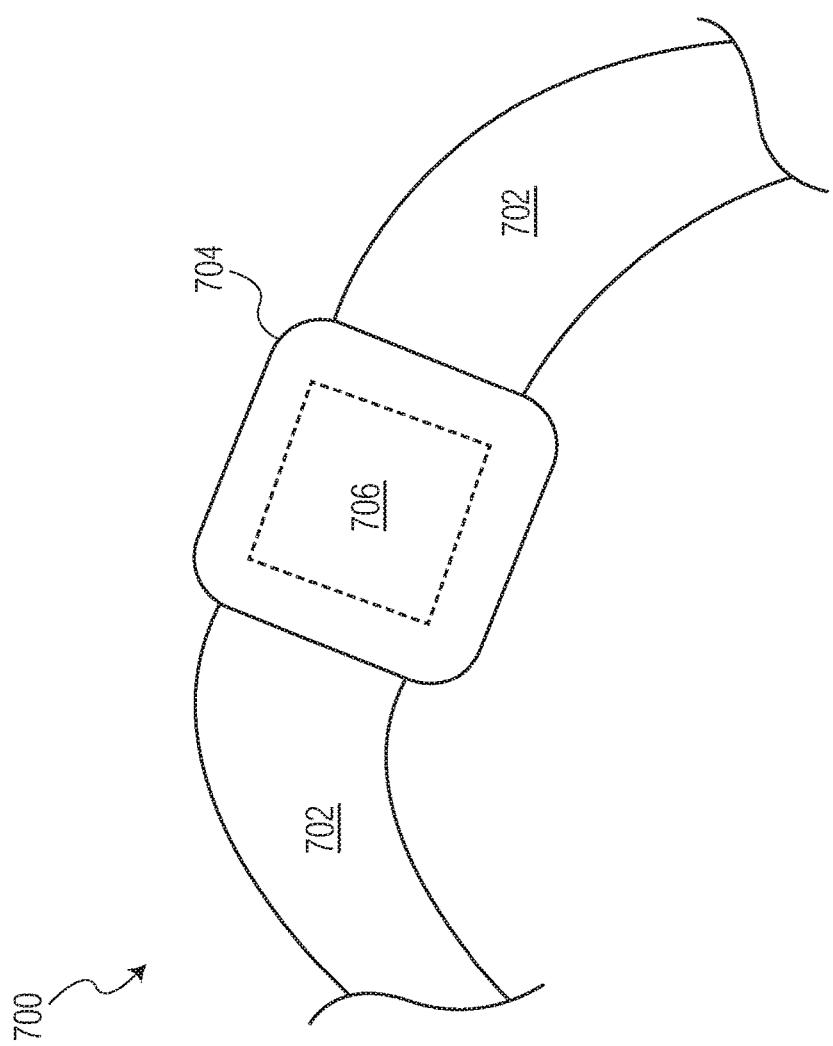
FIG. 6 is a perspective view of an example wearable device including either the second, third or fourth example structures for the near-field electromagnetic induction (NFEMI) antenna.

FIG. 6 is a perspective view of an example wearable device 700 including either the second, third or fourth example structures for the near-field electromagnetic induction (NFEMI) antenna. The example device 700 in this embodiment is a smartwatch. The device 700 includes a wristband 702, a housing 704 and an electronic device 706. The electronic device 706 in certain example embodiments includes electrical components (e.g. ICs, discretes, etc.) and a wireless antenna. Since the wireless NFEMI antenna is integrated into the housing 704 of the wearable device 700, a variety of wristbands 702, both conductive and non-conductive, may be chosen and not attenuate the wireless NFEMI antenna signal.

The example wearable device 700 is now discussed in more detail.

Figure 7:
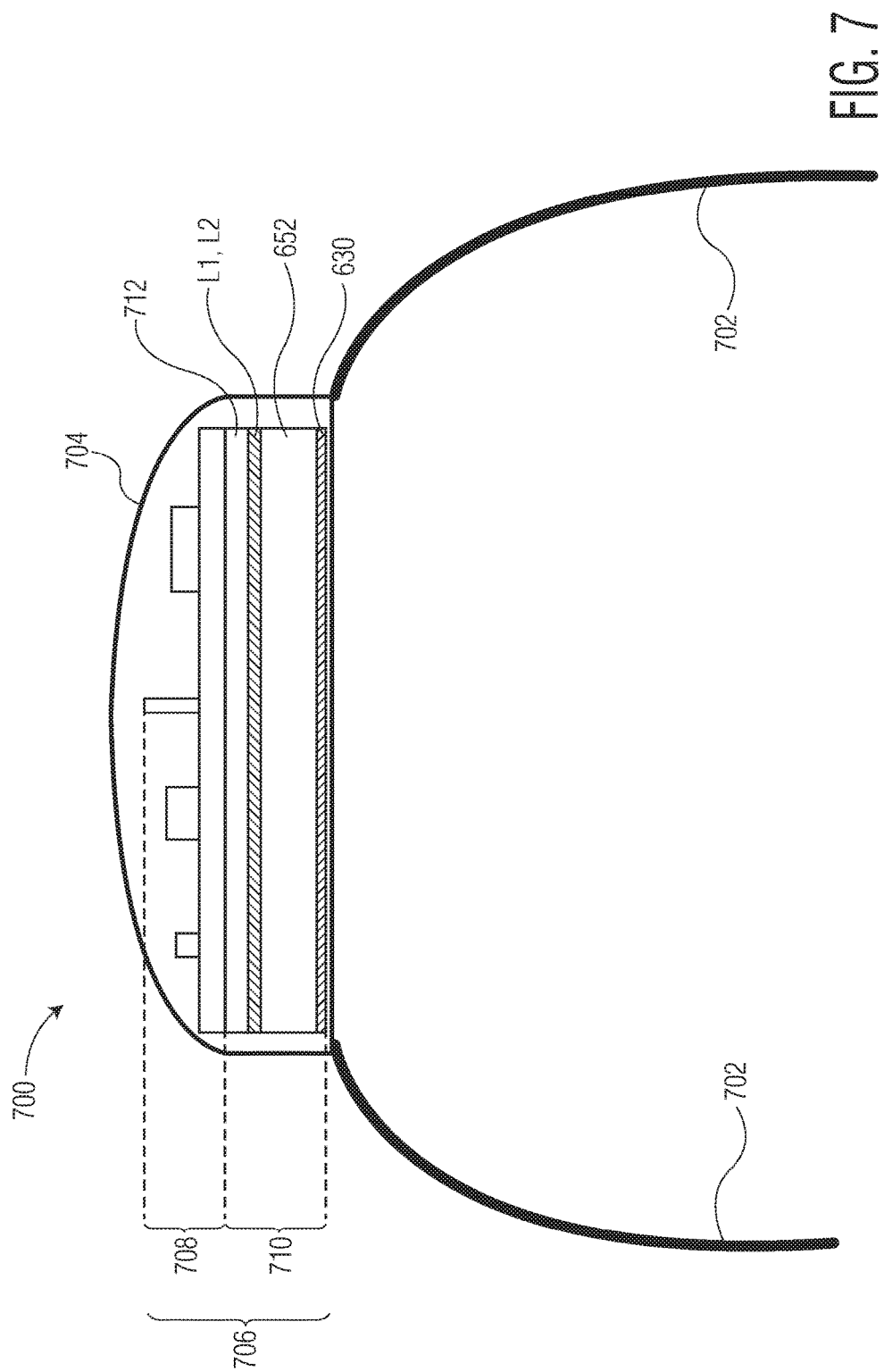
FIG. 7 is a cross-sectional view of the example wearable device.

FIG. 7 is a cross-sectional view of the example wearable device 700. In this example wearable device 700 the electronic device 706 includes electronic components 708 and a wireless NFEMI antenna 710. In this example, the third example structure 650 shown in FIGS. 4A and 4B is incorporated into the wireless device 700. Other antenna structures could be used in alternate example embodiments.

The wireless NFEMI antenna 710 includes coils L1, L2, plate 625 (i.e. L1), plate 630, substrate 652 and a ferrite shield 712.

In one example, the plate 630 is an electrical conductive surface with an open end. In this example, the third example structure 650 shown in FIGS. 4A and 4B has been folded along line 654 and now is in a stacked configuration. In this configuration, the coils L1, L2 are closest to the electronic components 708 and the plate 630 is closest to a lower, outer surface of the housing 704 that would be proximate to a user's skin when the device 700 is worn by the user.

The substrate 652 separates the coils L1, L2 from the plate 630. The substrate 652 can be air or any dielectric material (e.g. plastic, DuPont's Kapton, etc.). In one example, the substrate 652 is about 2 mm thick.

The ferrite shield 712, or another magnetic permeable material, is positioned between the coils L1, L2 and the electronic components 708. The ferrite shield 712 forms a low impedance path for magnetic field lines generated by the coils L1, L2. The ferrite shield 712 also increases an overall inductance of the antenna structure 650, thus spatially amplifying the magnetic flux away from the electronic components 708 and toward the plate 630, thus improving an energy efficiency and transmission quality of the wearable device 700.

The ferrite shield 712 thus allows the antenna structure 650 to be close to the electronic components 708 and any other electrically conductive parts in the smartwatch housing 704 that are used for the functionality of the smartwatch's operation.

In certain example embodiments, the ferrite shield 712 can be very thin (e.g. 0.1 mm thick). An example of ferrite shield 712 material is 240-2799-ND from manufacturer LAIRD. This example material is very effective for frequencies around 10 MHz. In alternate example embodiments, the ferrite shield 712 can be any magnetic permeable material.

In other example embodiments, an additional conductive layer is inserted between the electronic components and the magnetic permeable material; or between the magnetic permeable material and the coils; to reduce the electric interference generated by the electronic circuit entering the antenna.

In various example embodiments, the ferrite shield 712 can vary from completely covering the antenna structure 650 to only partially blocking the magnetic flux from the antenna structure 650 from interfering with specific components within the electronic components 708. The ferrite shield 712 need not be contiguous but could have a chessboard, or any other discontinuous layout.

The antenna structure's 650 resonance frequency can be tuned at a carrier frequency using a capacitor bank (not shown). The antenna structure's 650 bandwidth can be tuned using a resistor bank (not shown). Both capacitive and resistive tuning banks can be integrated into a radio integrated circuit. In one example embodiment, a carrier frequency for communicating the NFEMI signals is 10.6 MHz+/−5 MHz.

Figure 8:
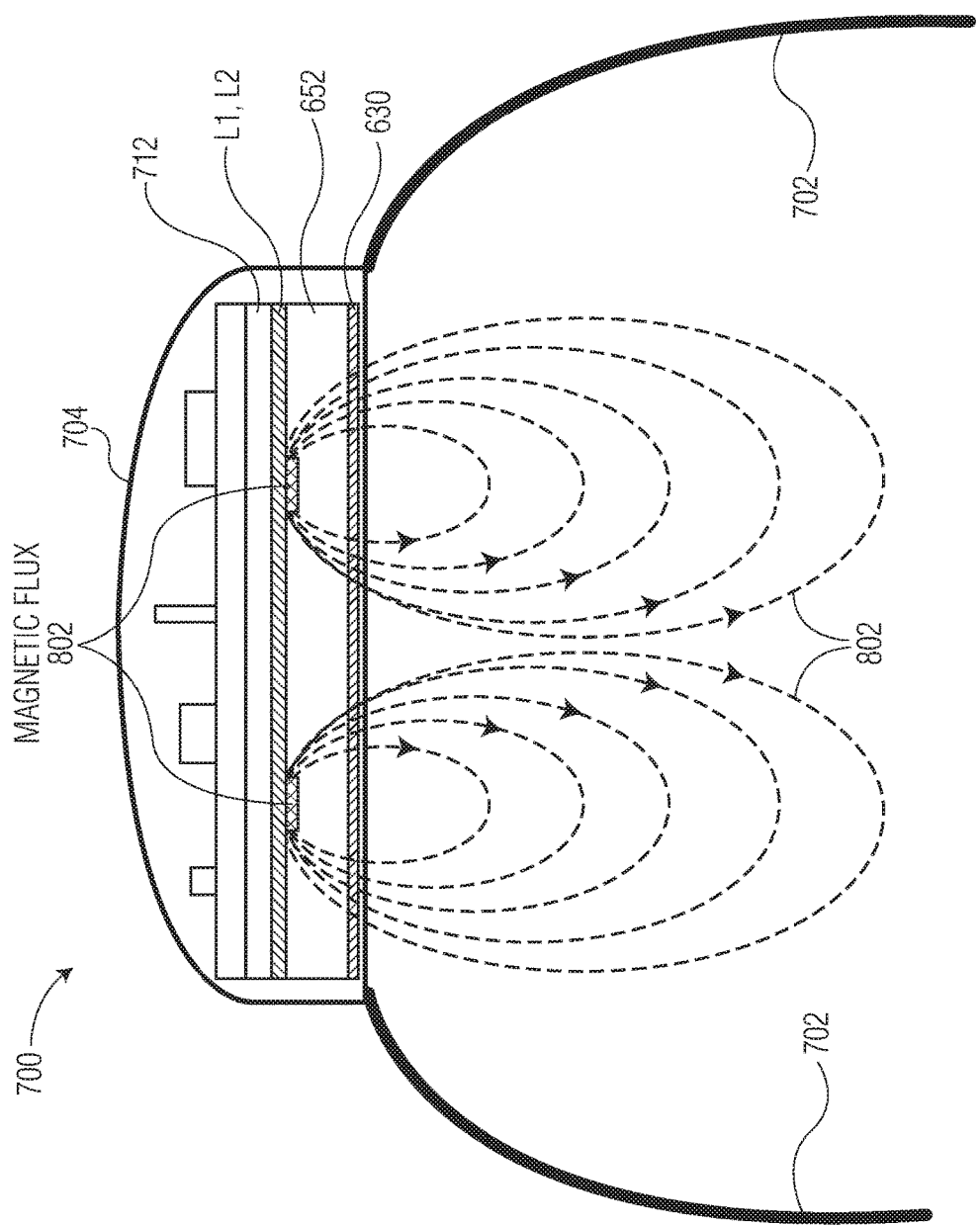
FIG. 8 is operational magnetic flux emitted from the example wearable device.

FIG. 8 is operational magnetic flux (i.e. field lines) 802 emitted from the example wearable device 700. As shown, the magnetic flux 802 is concentrated in the ferrite shield 712 thereby shielding the electronic components 708. The magnetic flux 802 is also amplified and directed toward the plate 630, which in use will be closest to a user wearing the device 700.

Use of the ferrite shield 712 thus improves a communication range for various NFEMI devices, especially those, such as smartwatches, that have a small form factor and thus require small antenna constructions that fit to small device housings. The NFEMI antenna with the ferrite shield can also be incorporated into many other products having conductive materials susceptible to magnetic interference.

Figure 9:
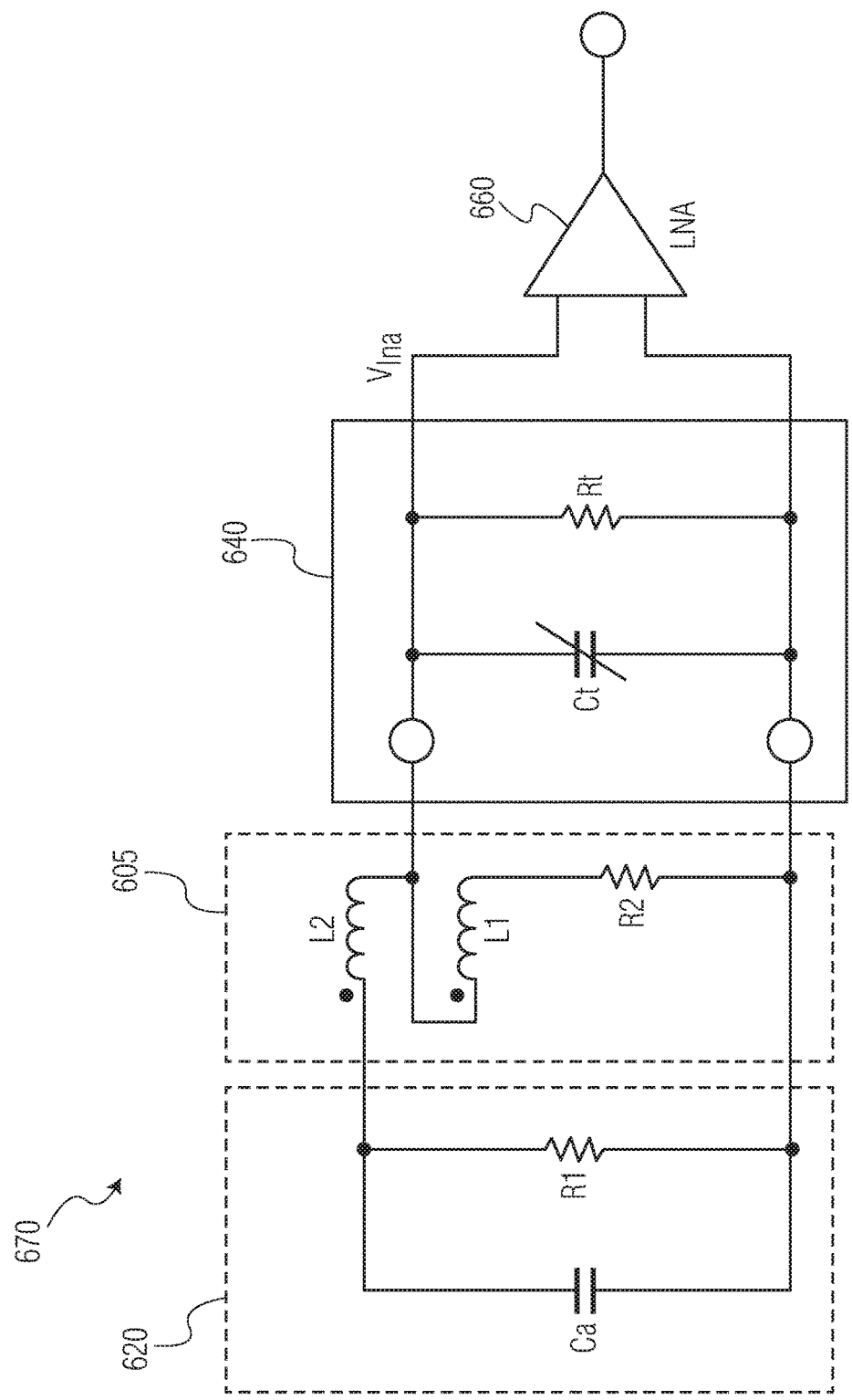
FIG. 9 is an example receiver circuit including either the second, third or fourth example structures for the near-field electromagnetic induction (NFEMI) antenna.

FIG. 9 is an example receiver circuit 670 including either the second 600, third 650 or fourth 1000 example structures for the near-field electromagnetic induction (NFEMI) antenna. Other example structures incorporating the ferrite shield 712 may also be used.

During reception, the magnetic field from a transmission coil will induce a voltage in the reception coils L1, L2 in the small loop antenna 605. Similarly an electric field from a transmission dipole will induce voltage in the reception dipole 620 including plates 625, 630. The receive system may include the tuning circuit 640 and a low-noise amplifier (LNA) 660 to amplify the received signal. Because both induced voltages may have a 180 degrees phase relationship they add together in a parallel antenna combination.

Figure 10:
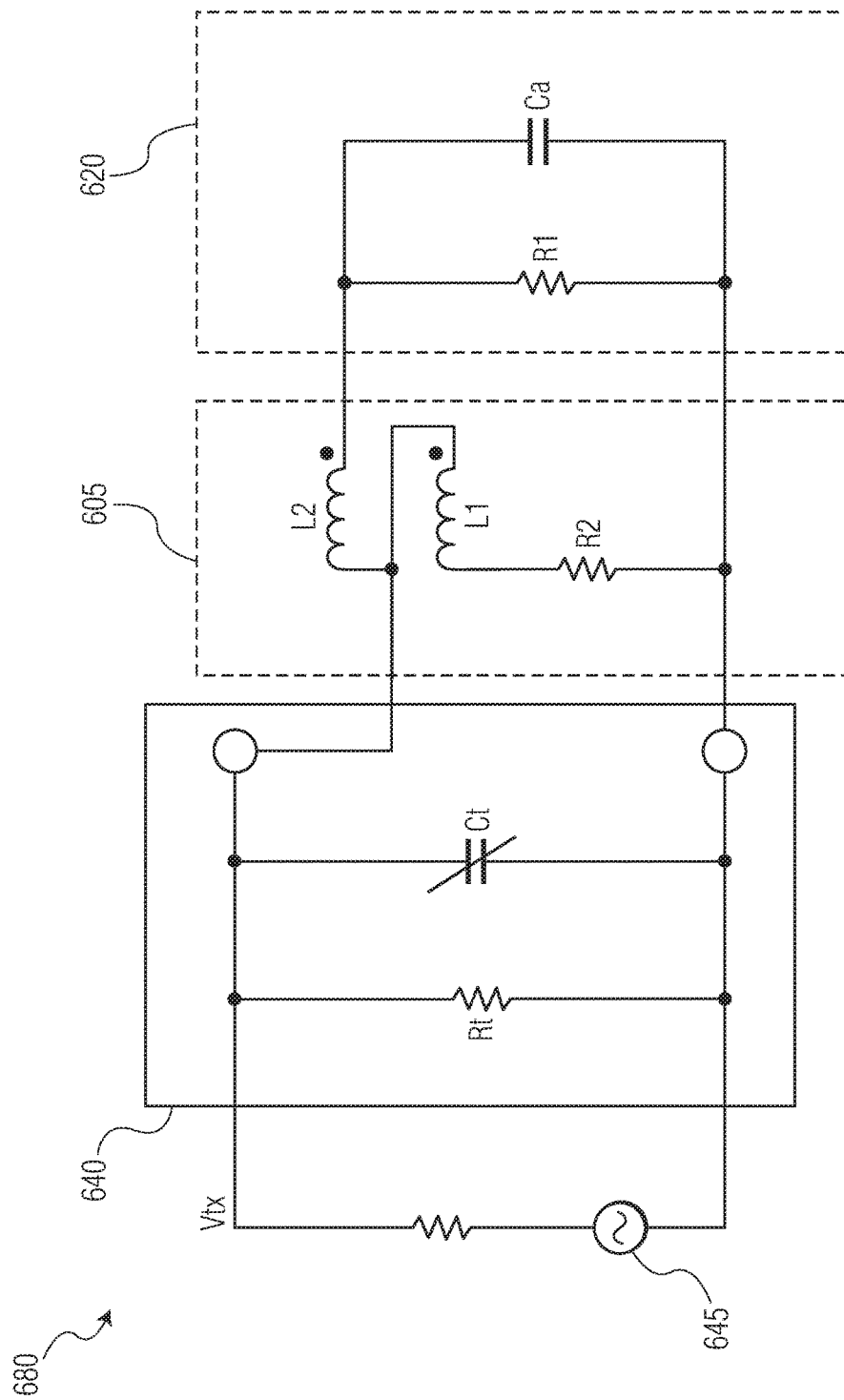
FIG. 10 is an example transmitter circuit including either the second, third or fourth example structures for the near-field electromagnetic induction (NFEMI) antenna.

FIG. 10 is an example transmitter circuit 680 including either the second 600, third 650 or fourth 1000 example structures for the near-field electromagnetic induction (NFEMI) antenna. Other example structures incorporating the ferrite shield 712 may also be used.

During transmission, a voltage source 645 of a transmit amplifier applies a voltage Vtx on the small loop antenna 605. The voltage across the coils L1, L2 of the small loop antenna 605 generates a current through the coils L1, L2. When a current in the coils L1, L2 is flowing, a magnetic field will be generated around the coils L1, L2. The generated magnetic field is linear function of the current through the coils.

In this specification, example embodiments have been presented in terms of a selected set of details. However, a person of ordinary skill in the art would understand that many other example embodiments may be practiced which include a different selected set of these details. It is intended that the following claims cover all possible example embodiments.

What is claimed is:

1. A near-field electromagnetic induction (NFEMI) antenna, comprising:
an electric antenna including a first electrically conductive planar surface;
a magnetic antenna including a first coil coupled to a second coil;
a first feeding connection coupled to one end of the first coil;
a second feeding connection coupled to another end of the first coil and one end of the second coil;
wherein another end of the second coil is connected to the electrically conductive surface; and
a magnetic permeable material coupled to one side of the magnetic antenna and configured to be placed between the magnetic antenna and a set of electric components;
wherein the first coil is a planar spiral coil; and
wherein the first coil is configured to function as a second electrically conductive surface in the electric antenna by physically facing the first electrically conductive planar surface.

2. The antenna of claim 1:
wherein the magnetic permeable material is configured to shield the set of electronic components from a magnetic field generated by the coils.

3. The antenna of claim 1:
wherein the magnetic permeable material is at least one of: a planar sheet, a ferrite shield, a ferrite sheet or a coating comprising ferrite particles in suspension.

4. The antenna of claim 1:
wherein the magnetic permeable material is configured to spatially amplify magnetic flux generated by the coils toward a direction opposite from the set of electronic components.

5. The antenna of claim 1:
wherein a position of the first electrically conductive surface is at least one of: between the set of electronic components and the magnetic permeable material or between the magnetic permeable material and the coils.

6. The antenna of claim 1:
wherein the magnetic permeable material includes an adhesive on one side for adhering to the coils.

7. The antenna of claim 1:
wherein the first electrically conductive surface and the coils are in a stacked configuration, wherein the first electrically conductive surface defines a first end of the stack and the coils define a second end of the stack.

8. The antenna of claim 7:
wherein a position of the magnetic permeable material is at least one of: between the coils and the first electrically conductive surface; or at either end of the stack.

9. The antenna of claim 7:
further comprising a substrate configured to physically separate the coils from the electrically conductive surface in the stack.

10. The antenna of claim 9:
wherein the substrate is at least one of: a dielectric material, a ferrite material, air, plastic or a polymer.

11. The antenna of claim 1:
wherein the first electrically conductive surface includes an open end.

12. The antenna of claim 1:
wherein the first electrically conductive surface is a plate.

13. The antenna of claim 1:
wherein the first electrically conductive planar surface and the planar spiral coil have substantially matching shapes.

14. The antenna of claim 1:
wherein the antenna is positioned on a backside of a mobile device or a wearable device.

15. A wearable device, comprising:
an electric antenna including a first electrically conductive planar surface;
a magnetic antenna including a first coil coupled to a second coil;
a first feeding connection coupled to one end of the first coil;
a second feeding connection coupled to another end of the first coil and one end of the second coil;
wherein another end of the second coil is connected to the electrically conductive surface; and
a magnetic permeable material coupled to one side of the magnetic antenna and configured to be placed between the magnetic antenna and a set of electric components;
wherein the electric and magnetic antennas form a near-field electromagnetic induction (NFEMI) antenna;
wherein the first coil is a planar spiral coil; and
wherein the first coil is configured to function as a second electrically conductive surface in the electric antenna by physically facing the first electrically conductive planar surface.

16. The device of claim 15:
wherein the antenna is embedded in at least one of: a smart watch; a smartwatch housing, a wireless mobile device, an earbud, a hearing aid, a headphone, an activity tracker, or a heart rate monitor.

17. The device of claim 15:
wherein the antenna is embedded in a transceiver configured to communicate using near-field electromagnetic induction with another wearable device.

18. The device of claim 15:
wherein the antenna is configured to communicate signals using both magnetic and electric near-field induction.

* * * * *